Aug. 28, 1923.
L. SAVICKS
TRAP
Filed April 18, 1922    3 Sheets-Sheet 1
1,466,602
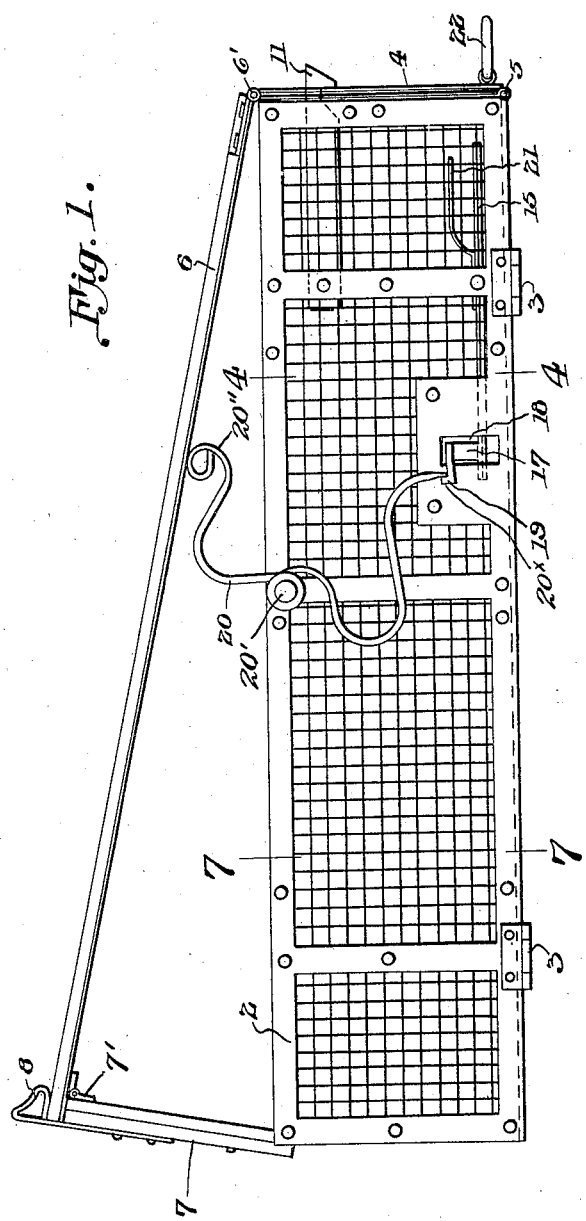
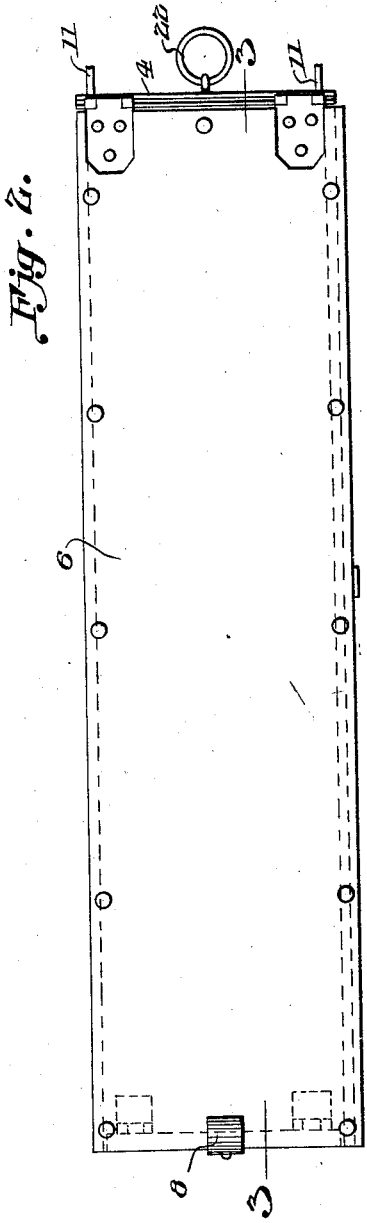
Langin Savicks
INVENTOR
BY Victor J. Evans
ATTORNEY
WITNESS:

Aug. 28, 1923.
L. SAVICKS
1,466,602
TRAP
Filed April 18, 1922    3 Sheets-Sheet 2
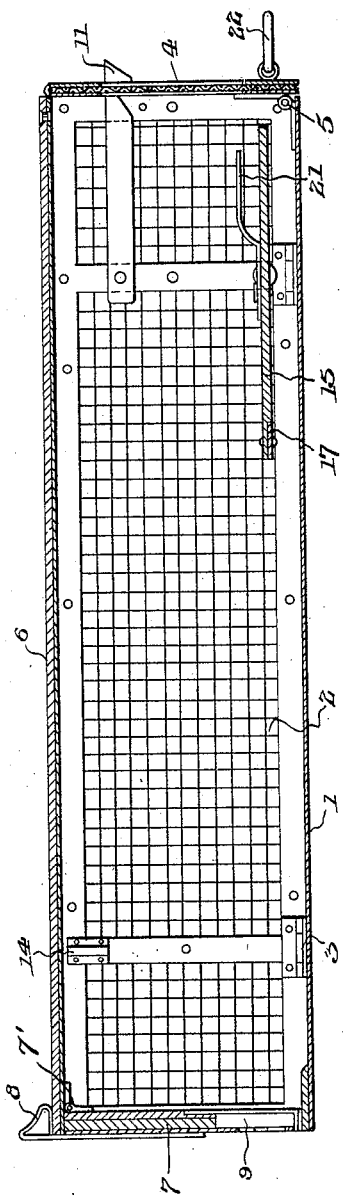
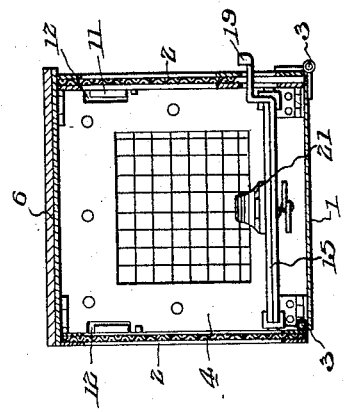
Langin Savicks
INVENTOR
BY Victor J. Evans
ATTORNEY
WITNESS:

Aug. 28, 1923.
L. SAVICKS
TRAP
Filed April 18, 1922
1,466,602
3 Sheets-Sheet 3
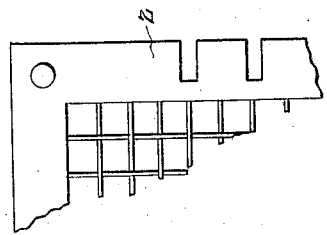
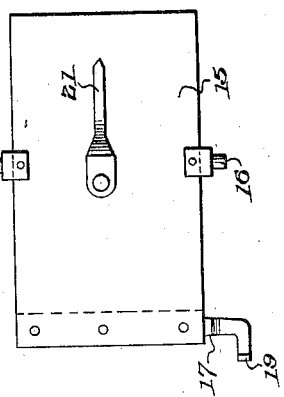
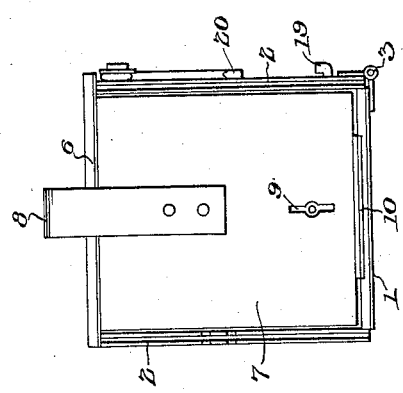
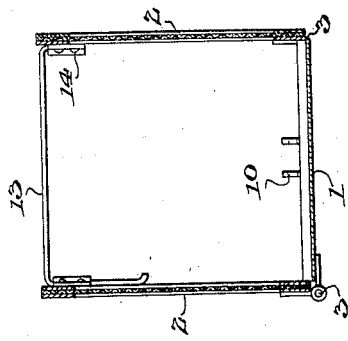
Langin Savicks, INVENTOR
BY *Victor J. Evans*
ATTORNEY
WITNESS:

Patented Aug. 28, 1923.

1,466,602

UNITED STATES PATENT OFFICE.

LONGIN SAVICKS, OF ROCKPORT, ILLINOIS, ASSIGNOR OF ONE-HALF TO ADOLPH P. DOCKUS, OF DETROIT, MICHIGAN.

TRAP.

Application filed April 18, 1922. Serial No. 554,419.

*To all whom it may concern:*

Be it known that I, LONGIN SAVICKS, a citizen of Lithuania, residing at Rockford, in the county of Winnebago and State of Illinois, have invented new and useful Improvements in Traps, of which the following is a specification.

This invention relates to an animal trap, the general object of the invention being to provide a trap that can be folded flat so that a number of traps can be easily transported or stored without taking but little space and one which will hold the animal without injuring it.

Another object of the invention is to provide a key controlled lock for the trap so that an unauthorized person cannot take an animal from the trap.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side elevation of the trap showing the same in open position.

Figure 2 is a plan view.

Figure 3 is a section on line 3—3 of Figure 2.

Figure 4 is a section on line 4—4 of Figure 1.

Figure 5 is a view of the front end of the trap.

Figure 6 is a fragmentary view of a part of one side thereof.

Figure 7 is a sectional view on line 7—7 of Figure 1.

Figure 8 is a plan view of the pan.

As shown in these views the trap comprises the bottom 1, the sides 2 which are hinged to the bottom, as shown at 3, the end 4 which is hinged to the bottom, as shown at 5, the top 6 which is hinged to the end 4 as shown at 6′ and the front end 7 which is hinged to the top as shown at 7′ so that it can be folded inwardly against the inner face of the top. A spring catch 8 normally holds the end 7 in a position at right angles to the top. A key operated lock 9 is carried by the end 7, the bolt of which is adapted to engage the perforated lugs 10 which are carried by the bottom. This arrangement of parts will permit the trap to be knocked down so that a number of traps can be easily carried to the points where they are to be set up and this knocked down feature also permits the traps to be stored in the minimum amount of space. In knocking down the trap the right hand side is folded over upon the lower face of the bottom and the other side is folded over upon the upper face thereof. The front end 7 is then folded upon the top 6 and said top 6 is then placed upon the upper side after swinging the rear end down.

The trap is held in set up condition by means of the latch bars 11 on the sides engaging slots 12 in the end 4 and by the cross bar 13 movably carried by one side and having its bent end engaging a socket 14 carried by the other side.

The bait pan 15 has its trunnions 16 engaging holes in the side so that the pan is tiltably supported within the trap. A bar 17 is secured to the front end of this pan and the end of this bar is extended and bent twice at right angles so that it will pass through an opening 18 formed in one of the sides, the extremity of the bar being carried forwardly and provided with an upwardly extending projection 19 which is engaged by the trigger member 20. This trigger member is pivotally supported upon one of the sides as shown at 20′ and has one of its extremities looped as shown at 20 to form a rounded part for engaging the under face of the top with its other extremity flattened as shown at 20$^x$ to engage the projection. Thus the top and the front end will be held in raised position by the trigger member when said trigger member is held in upright position by the projection on the bar, on the tread or pan. This pan is provided with a bait holder 21 which is so arranged that an animal must step on the pan in order to reach the bait. The animal's weight will thus depress the front end of the pan so as to move the projection 19 on the bar 17 away from the flattened end of the trigger member and thus permit the weight of the parts to cause the top and front end to drop and thus enclose the animal in the trap. The parts will be held in this closed position by the lock so that in order to remove the animal the trapper must first unlock the trap. Of course if desired this lock can be omitted, though it is desirable in order to prevent stealing of the trapped animal. By bending the projection carrying bar on the pan, as shown, the pan can be folded upon one side after its trunnions have been withdrawn from the holes in the sides. A ring 22 is secured to a part of the trap so as to permit the trap to be chained or otherwise secured to a log or other object.

This trap can be used for catching animals as well as birds and by placing several projections on the pan bar the top and end can be supported at different heights as desired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A trap of the class described comprising a bottom piece, side pieces hingedly connected therewith, an end piece hingedly connected with the bottom piece, latch members for connecting the side pieces with the end piece, a movable closing piece connecting the two side pieces together, a top piece hingedly connected with the end piece, a front end piece hingedly connected with the top piece, a spring latch for holding the front end piece in extended position, a bait pan, trunnions thereon, the side pieces having holes therein for receiving the trunnions, a trigger member pivotally secured to one of the side pieces and having one end adapted to engage the top piece to hold the same in raised position and a projection on the bait pan for engaging the other end of the trigger member to hold the same in inoperative position.

In testimony whereof I affix my signature.

LONGIN SAVICKS.